US 12,124,631 B2

(12) United States Patent
Evreinov et al.

(10) Patent No.: US 12,124,631 B2
(45) Date of Patent: Oct. 22, 2024

(54) MULTIFUNCTIONAL HAPTIC ACTUATOR

(71) Applicant: Huawei Technologies Co., Ltd., Shenzhen (CN)

(72) Inventors: Grigori Evreinov, Tampere (FI); Patrick Coe, Tampere (FI); Ahmed Farooq, Tampere (FI); Roope Raisamo, Tampere (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 17/841,376

(22) Filed: Jun. 15, 2022

(65) Prior Publication Data
US 2022/0308673 A1    Sep. 29, 2022

Related U.S. Application Data

(63) Continuation of application No. PCT/EP2019/085370, filed on Dec. 16, 2019.

(51) Int. Cl.
*G06F 3/01*  (2006.01)
*H02N 2/18*  (2006.01)

(52) U.S. Cl.
CPC ............ *G06F 3/016* (2013.01); *H02N 2/186* (2013.01)

(58) Field of Classification Search
CPC ....... G06F 3/016; G06F 1/1626; H02N 2/186; B06B 2201/53; B06B 2201/54;
(Continued)

(56) References Cited

U.S. PATENT DOCUMENTS

| 3,383,531 | A  | 5/1968  | Neculai |
| 7,182,691 | B1 | 2/2007  | Schena |
| 7,843,277 | B2 | 11/2010 | Gregorio et al. |
| 9,118,187 | B1 | 8/2015  | Islam |
| 9,142,754 | B2 | 9/2015  | Jiang |

(Continued)

FOREIGN PATENT DOCUMENTS

| CN | 109189208 A | * | 1/2019 | ............. G06F 3/016 |
| EP | 3208688 A1 | | 8/2017 | |

(Continued)

OTHER PUBLICATIONS

Yang et al., A New Subminiature Impact Actuator for Mobile Devices, IEEE World Haptics Conference 2011, Istanbul, Turkey, Total 6 pages, Institute of Electrical and Electronics Engineers, New York, New York (Jun. 21-24, 2011).

(Continued)

*Primary Examiner* — Angelica M McKinney
(74) *Attorney, Agent, or Firm* — Leydig, Voit & Mayer, Ltd.

(57) ABSTRACT

A multifunctional haptic actuator having actuation modes, including an actuation arrangement and at least one moveable energy storage. The actuation arrangement provides and facilitates movement of the energy storage along and around actuation axes. The energy storage supplies electric charge to drive the actuation arrangement, and stores electric charge generated by the actuation arrangement. A first functional actuation mode includes generating mechanical vibrations by supplying electric charge from the energy storage to the actuation arrangement, the electric charge generating movement of the energy storage. A second functional actuation mode includes generating electric charge by mechanical vibrations of the energy storage, the vibrations generating electric charge in the actuation arrangement, the electric charge being stored in the energy storage.

15 Claims, 1 Drawing Sheet

(58) Field of Classification Search
CPC ....... B06B 2201/55; B06B 1/045; B06B 1/02; H02J 50/12; H02J 7/32
See application file for complete search history.

(56) References Cited

U.S. PATENT DOCUMENTS

| | | | |
|---|---|---|---|
| 9,350,222 | B2 | 5/2016 | Takahashi |
| 10,193,374 | B2 | 1/2019 | Kursula et al. |
| 10,218,250 | B2 | 2/2019 | Berrezag et al. |
| 2003/0201975 | A1 | 10/2003 | Bailey et al. |
| 2010/0013610 | A1 | 1/2010 | Schwieger |
| 2013/0201127 | A1 | 8/2013 | Abe et al. |
| 2014/0071071 | A1 | 3/2014 | Hirose et al. |
| 2014/0285149 | A1* | 9/2014 | Zhang ............ H02J 7/32 320/114 |
| 2014/0327530 | A1 | 11/2014 | Lacroix et al. |
| 2015/0076967 | A1 | 3/2015 | Kim et al. |
| 2016/0124555 | A1* | 5/2016 | Hong ............ G06F 3/016 345/173 |
| 2016/0241119 | A1 | 8/2016 | Keeler |
| 2017/0288443 | A1* | 10/2017 | Kursula ............ H02J 50/12 |
| 2018/0181202 | A1 | 6/2018 | Khoshkava et al. |
| 2018/0296150 | A1 | 10/2018 | Wang et al. |

FOREIGN PATENT DOCUMENTS

| | | | | |
|---|---|---|---|---|
| EP | 3208688 | B1 * | 4/2019 | ........... G06F 1/1626 |
| JP | 2003236470 | A | 8/2003 | |
| JP | 2010246334 | A | 10/2010 | |
| KR | 101199435 | B1 | 11/2012 | |
| WO | 2008028016 | A2 | 3/2008 | |
| WO | 2015123361 | A1 | 8/2015 | |

OTHER PUBLICATIONS

Welcome et al., "An examination of the vibration transmissibility of the hand-arm system in three orthogonal directions," International Journal of Industrial Ergonomics 45, Total 14 pages (2015).

"Application Note Benefits of Auto-Resonance Tracking," SLOA188A, Texas Instruments, Total 9 pages (Oct. 2013).

Smith et al., "Design and Optimization of a Voice Coil Motor With a Rotary Actuator for an Ultrasound Scanner," IEEE Transactions on Industrial Electronics, vol. 62, No. 11, Total 6 pages, Institute of Electrical and Electronics Engineers, New York, New York (Nov. 2015).

"DRV2603 Haptic Drive With Auto-Resonance Detection for Linear Resonance Actuators (LRA)," SLOS754C, Texas Instruments, Total 24 pages (Jun. 2012—Revised Aug. 2016).

Nemat-Nasser et al., "Electromechanical response of ionic polymer-metal composites," Journal of Applied Physics, vol. 87, No. 7, American Institute of Physics, Total 11 pages (Apr. 1, 2000).

Choi et al., "Halbach Magnetic Circuit for Voice Coil Motor in Hard Disk Drives," Journal of Magnetics, Total 6 pages (Sep. 2010).

"Haptics: Solutions for ERM and LRA Actuators," Texas Instruments, Texas Instruments Incorporated, Total 5 pages (2013).

Rasmussen, "Human Body Vibration Exposure and Its Measurement," The Journal of the Acoustical Society of America 73(6), Technical Review To Advance Techniques in Acoustical, Electrical, and Mechanical Measurements, No. 1, Total 39 pages (1982).

Guignard, "Human Sensitivity to Vibration," J. Sound Vib. 15(1), Total 6 pages (1971).

Mansfield, "Human Response to Vibration." Taylor and Francis e-Library, CRC Press, Total 266 pages (2005).

Cavarec et al., "New Multi-Rod Linear Actuator for Direct-Drive, Wide Mechanical Bandpass Applications," IEEE Transactions on Industry Applications, vol. 39, No. 4, Total 10 pages, Institute of Electrical and Electronics Engineers, New York, New York (Jul./Aug. 2003).

Nakashima et al., "The effects of vibration frequencies on physical, perceptual and cognitive performance" Defence Research and Development Canada, Technical Report DRDC Toronto TR 2006-218, Total 30 pages (Oct. 2006).

Pyykko et al., "Transmission of vibration in the hand arm system with special reference to changes in compression force and acceleration," Scandinavian Journal of Work, Environment and Health, Total 10 pages (1976).

* cited by examiner

MULTIFUNCTIONAL HAPTIC ACTUATOR

CROSS-REFERENCE TO RELATED APPLICATIONS

This application is a continuation of International Application No. PCT/EP2019/085370, filed on Dec. 16, 2019, the disclosure of which is hereby incorporated by reference in its entirety.

FIELD

The disclosure relates to a haptic actuator having a plurality of functional actuation modes.

BACKGROUND

As computer miniaturization progresses, an increasing number of features are expected to be incorporated into ever smaller packages. Consumer products, such as mobile and wearable devices, smart garments, and their accessories, may generally include vibrators for generating tactile information such as conventional (warnings) and conditional cues (directional, numerical, rhythmic and so on). For example, a mobile phone and wrist wearable devices (as smart watches and trackers) have embedded vibrators for generating tactile feedback signals while being in contact with the user.

There are different types of vibration generating actuators, such as miniature direct current (DC) motors with rotating eccentric mass (ERM) and voice-coil motors (VCM) with seismic or proof mass, which have been the most popular, robust, and efficient technologies for a long time.

In order to be efficient, actuators or haptic exciters such as ERM and VCM should be able to generate high acceleration applied to a seismic mass that has usually a limited displacement in a single direction at a mechanical resonance frequency.

The ERM vibration motors mostly generate harmonic vibrations and distribute force vectors between two orthogonal directions of the plane which are orthogonal to the axis of the motor shaft. This often makes them less efficient than unidirectional (linear or/and resonant) haptic actuators.

In VCM motors, a movable body is attached to a vibration substrate and driven back and forth using various physical forces and phenomena or "smart materials". Many of these actuators, and the devices that they interact with, have their own resonant frequencies, and therefore, it is very important to optimally and dynamically determine and control driving signals to generate the haptic effects in the most effective and efficient way to optimize the actuation of the VCM device. However, this type of actuators typically have limited functionality as they produce vibration signals in a relatively narrow bandwidth of frequencies (being only efficient near the resonant frequency+/−10 Hz). Furthermore, the VCMs are inefficient at generating a highly asymmetric form of vibration signal over a wide range of oscillation frequencies. In addition, some actuators consume significant power and are limited in their applications because of their size and mass.

SUMMARY

The present disclosure provides an improved haptic actuator.

According to a first aspect, there is provided a multifunctional haptic actuator having a plurality of functional actuation modes, the haptic actuator comprising an actuation arrangement and at least one moveable energy storage, the actuation arrangement provides or/and facilitates movement of the energy storage along and/or around a plurality of actuation axes, the energy storage being adapted for supplying electric charge to drive the actuation arrangement, and storing electric charge generated by the actuation arrangement, a first functional actuation mode comprising generating mechanical vibrations by supplying electric charge from the energy storage to the actuation arrangement, the electric charge generating movement of the energy storage, and a second functional actuation mode comprising generating electric charge by means of mechanical vibrations of the energy storage, the vibrations generating electric charge in the actuation arrangement, the electric charge being stored in the energy storage.

This solution provides an actuator the components of which can be used in several different actuation modes, hence reducing the need for separate components for each mode. The actuator has a simple configuration and structure, can be produced at low cost, and is capable of generating re-chargeable energy as well as larger forces than a linear resonance actuator and/or an inertial mass eccentric motor. Furthermore, there is no more need of extra space allocated for the seismic mass of the actuator. Furthermore, the weight of the actuator and/or the device into which is mounted is reduced.

In a possible implementation form of the first aspect, the vibrations are generated at frequencies below: 30 Hz, preferably below 20 Hz. This facilitates efficient, based on human sensitivity, vibration frequencies in visual-motor tasks and tracking.

In a further possible implementation form of the first aspect, the actuation arrangement generates electromagnetic or piezoelectric forces, and, in the first functional actuation mode, the electric charge supplied from the energy storage to the actuation arrangement generates the forces, the forces generating movement of the energy storage, and in the second functional actuation mode, mechanical vibrations of the energy storage generates the forces, the forces generating electric charge to be stored in the energy storage. This facilitates actuation modes providing haptic feedback or/and generating re-chargeable energy.

In a further possible implementation form of the first aspect, the haptic actuator further comprises a third functional actuation mode, the third functional actuation mode comprising generating electric charge in the actuation arrangement by means of a magnetic energy transmitter, the electric charge being stored in the energy storage. This facilitates an actuation mode capable of harvesting electrical energy wirelessly.

In a further possible implementation form of the first aspect, the plurality of actuation axes comprises at least one linear axis and/or at least one rotation axis.

In a further possible implementation form of the first aspect, movement of the energy storage is executed along and/or around the plurality of actuation axes simultaneously, allowing the actuation to be multidimensional, preferably three-dimensional.

In a further possible implementation form of the first aspect, movement of the energy storage is executed along a first actuation axis, a second actuation axis, and a third actuation axis, simultaneously or sequentially, the first actuation axis, the second actuation axis, and the third actuation axis forming a three-dimensional Cartesian coordinate system.

In a further possible implementation form of the first aspect, the actuation arrangement comprises a voice coil actuator, the voice coil actuator comprising a first magnet-and-coil arrangement generating movement along the first actuation axis, the voice coil actuator comprising a second magnet-and-coil arrangement generating movement along the second actuation axis and the third actuation axis, taking advantage of the reliability and size of available actuation components.

In a further possible implementation form of the first aspect, the first magnet-and-coil arrangement comprises a first magnet and a first coil arranged adjacent the first magnet, and the second magnet-and-coil arrangement comprises a second magnet and a second coil arranged adjacent the second magnet.

In a further possible implementation form of the first aspect, the first coil is arranged such that it extends around a periphery the first magnet, and the second magnet-and-coil arrangement further comprises a third magnet and a third coil arranged adjacent the third magnet, a fourth magnet and a fourth coil arranged adjacent the fourth magnet, and a fifth magnet and a fifth coil arranged adjacent the fifth magnet, the second magnet-and-coil arrangement being arranged such that it extends around a periphery of the first magnet-and-coil arrangement, hence providing evenly distributed forces.

In a further possible implementation form of the first aspect, the rotation axis is identical to the first actuation axis, and rotation around the rotation axis is generated by the first magnet-and-coil arrangement.

In a further possible implementation form of the first aspect, the actuation arrangement comprises a multi-layered piezoelectric actuator, or any one of electromechanical polymer-metal composite or alloy material, magnetorestricitive material, electroactive material, photoactive material, temperature active material, and magnetoactive material, allowing any suitable choice of actuator to be used.

In a further possible implementation form of the first aspect, the haptic actuator further comprises at least one elastic element limiting the movement of the energy storage along and/or around the plurality of actuation axes. The elastic element limits the displacement of the energy storage yet provides maximum alterations of the magnetic flux with respect to the coils fixed position, without constraining the mechanical resonance of the actuator to a specific value within a dynamic range of frequencies.

According to a second aspect, there is provided a multifunctional haptic actuation system for an electronic device comprising the haptic actuator according to the above, a processor, control circuitry, and a flexible battery cable extending from the energy storage to an exterior of the haptic actuator. This solution provides a system in which the components can be used in several different actuation modes such as providing haptic feedback and harvesting energy, hence reducing the need for separate components for each mode.

In a possible implementation form of the second aspect, the haptic actuation system further comprises at least one position sensor adapted for tracking the position of the haptic actuator.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figures 1, 2:
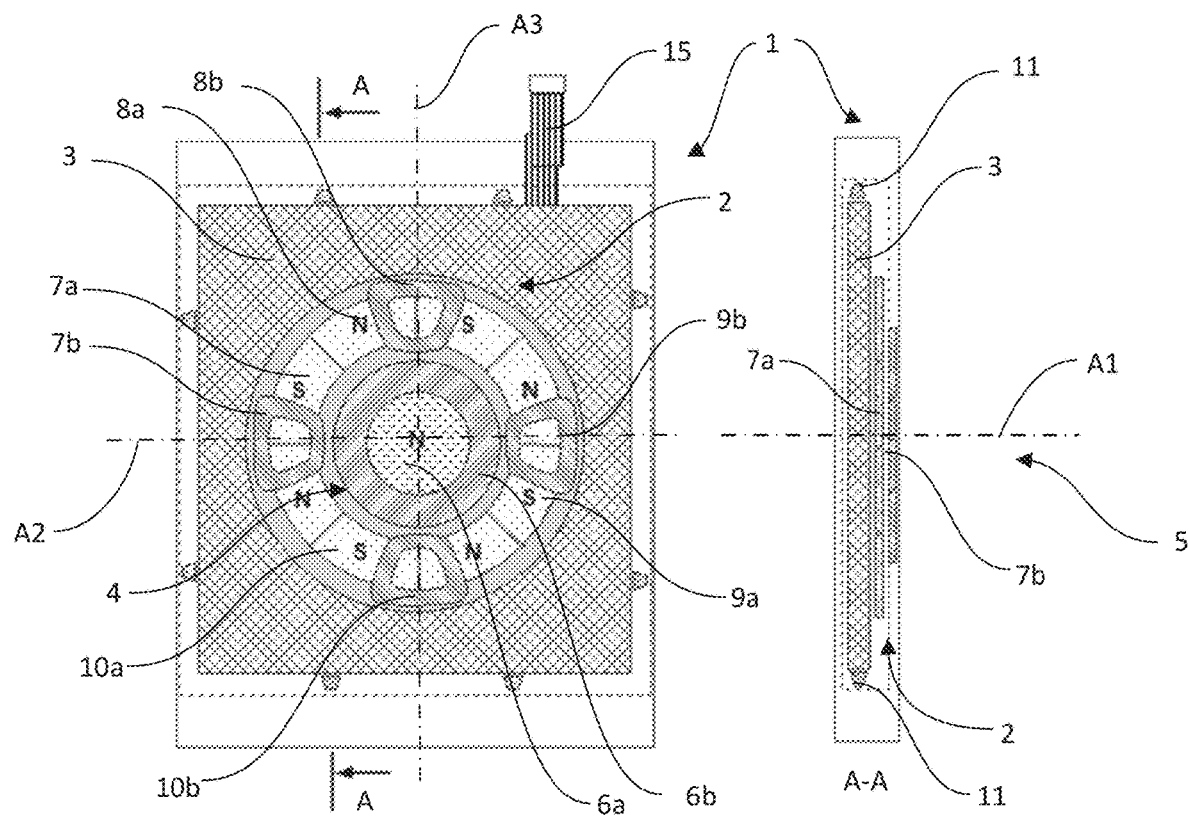
FIG. 1 shows a schematic top view of a multifunctional haptic actuator in accordance with one embodiment of the present disclosure.
FIG. 2 shows a cross-sectional side view of the multistep actuation system shown in FIG. 1.

FIGS. 1 and 2 show a multifunctional haptic actuator 1 having a plurality of functional actuation modes.

The haptic actuator 1 comprises an actuation arrangement 2 and at least one moveable energy storage 3, preferably arranged within a housing. The actuation arrangement 2 facilitates movement of the energy storage 3 along and/or around a plurality of actuation axes A1, A2, A3, the energy storage 3 functioning as a seismic mass. The plurality of actuation axes may comprise at least one linear axis and/or at least one rotation axis. The rotation axis may be identical to the first actuation axis A1. Movement of the energy storage 3 may be executed along and/or around the plurality of actuation axes simultaneously.

The energy storage 3, e.g. a battery, is adapted for supplying electric charge to drive the actuation arrangement 2, and for storing electric charge generated by the actuation arrangement 2.

A first functional actuation mode comprises generating mechanical vibrations by supplying electric charge from the energy storage 3 to the actuation arrangement 2, the electric charge generating movement of the energy storage 3, also referred to as haptic feedback mode.

A second functional actuation mode comprises generating electric charge by means of mechanical vibrations of the energy storage 3, the vibrations generating electric charge in the actuation arrangement 2, and the electric charge being stored in the energy storage 3, also referred to as energy harvesting mode.

The vibrations may be generated at frequencies below 30 Hz, preferably below 20 Hz.

In one embodiment, the actuation arrangement 2 generates electromagnetic or piezoelectric forces. In the first functional actuation mode, the electric charge supplied from the energy storage 3 to the actuation arrangement 2 generates the forces, and the forces generate movement of the energy storage 3. In the second functional actuation mode, mechanical vibrations of the energy storage 3 generate the forces, and the forces generate electric charge to be stored in the energy storage 3.

The haptic actuator 1 may further comprise a third functional actuation mode, the third functional actuation mode comprising generating electric charge in the actuation arrangement 2 by means of a magnetic energy transmitter, the electric charge being stored in the energy storage 3, also referred to as wireless charging mode.

In one embodiment, the movement of the energy storage 3 is executed along a first actuation axis A1, a second actuation axis A2, and a third actuation axis A3, simultaneously or sequentially, the first actuation axis A1, the second actuation axis A2, and the third actuation axis A3 forming a three-dimensional Cartesian coordinate system as shown in FIGS. 1 and 2.

The actuation arrangement 2 comprises a voice coil actuator comprising a first magnet-and-coil arrangement 4, generating movement along the first actuation axis A1, and a second magnet-and-coil arrangement 5, generating movement along the second actuation axis A2 and the third actuation axis A3. The coils may be embedded into the cover of a battery housing or a mobile device.

The first magnet-and-coil arrangement 4 may comprises a first magnet 6a and a first coil 6b arranged adjacent the first magnet 6a. The first coil 6b may be arranged such that it extends around a periphery the first magnet 6a. In one embodiment, rotation around the rotation axis is generated by the first magnet-and-coil arrangement 4.

The second magnet-and-coil arrangement 5 may comprise a second magnet 7a and a second coil 7b arranged adjacent the second magnet 7a. The second magnet-and-coil arrangement 5 may furthermore comprise a third magnet 8a and a third coil 8b arranged adjacent the third magnet 8a, a fourth magnet 9a and a fourth coil 9b arranged adjacent the fourth magnet 9a, and a fifth magnet 10a and a fifth coil 10b arranged adjacent the fifth magnet 10a. The pairs of magnet and coil are preferably distributed equidistantly around the first magnet-and-coil arrangement 4, such that the second magnet-and-coil arrangement 5 extends around a periphery of the first magnet-and-coil arrangement 4, i.e. the first coil 6b being arranged between the first magnet 6a and the second magnet-and-coil arrangement 5.

The actuation arrangement 2 may furthermore comprise a multi-layered piezoelectric actuator, or any one of electromechanical polymer-metal composite or alloy material, magnetorestricitive material, electroactive material, photoactive material, temperature active material, and magnetoactive material (not shown).

The haptic actuator may also comprise at least one elastic element 11, shown in FIG. 2, limiting the movement of the energy storage 3 along and/or around the plurality of actuation axes. The elastic element 11 may limit the displacement of the energy storage 3 yet provide maximum alterations of the magnetic flux with respect to the coils fixed position, without constraining the mechanical resonance of the actuator to a specific value within a dynamic range of frequencies.

Figure 3:
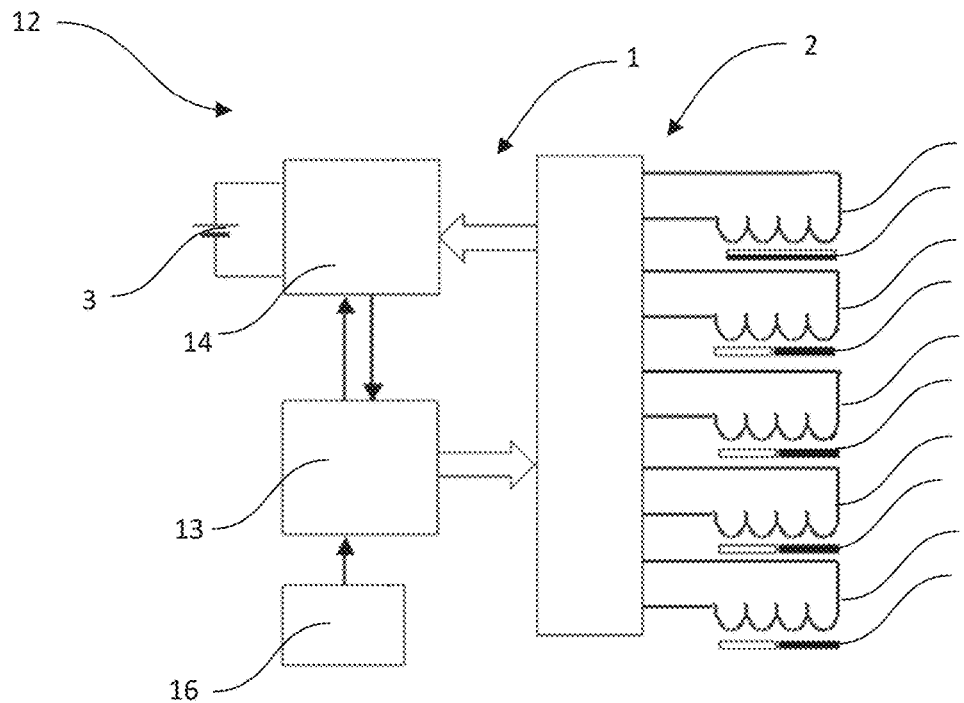
FIG. 3 shows a schematic illustration of a multifunctional haptic actuation system in accordance with one embodiment of the present disclosure.

The present disclosure furthermore relates to a multifunctional haptic actuation system 12 for an electronic device, such as a smartphone, laptop computer, tablet computer, or wearable device such as a watch or bracelet. As shown in FIG. 3, the haptic actuation system 12 comprises the above-described haptic actuator 1, a processor 13, control circuitry 14, and a flexible battery cable 15 extending from the energy storage 3 to an exterior of the haptic actuator 1. The flexible battery cable 15 allows the energy storage 3 of the haptic actuator 1 move towards and from the magnet-and-coil arrangements 4, 5 along the predefined direction or/and to turn around the rotation axis by producing the proper vector of torque.

The processor 13 controls the functional actuation modes and functionalities of the coils operating differently to harvest energy or excite the energy storage 3 oscillations. The control circuitry 14 can be activated when the coils are capable of harvesting electromagnetic energy as a result of mechanical displacements (vibration) of the magnets, or from a wireless charging power transmitter. In contrast, a coil driving mechanism (not shown) may be activated when the software application of a mobile device needs to deliver haptic information to the user.

The haptic actuation system 12 may further comprise at least one position sensor 16 adapted for tracking the position of the haptic actuator 1. The position sensor 16 tracks the position by increasing the efficiency of the different functional actuation modes.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

What is claimed is:

1. A multifunctional haptic actuator having a plurality of functional actuation modes, the multifunctional haptic actuator comprising:
    an actuation arrangement; and
    at least one moveable energy storage,
    wherein the actuation arrangement is configured to provide or facilitate movement of the energy storage along or around a plurality of actuation axes,
    wherein the energy storage is configured to supply electric charge to drive the actuation arrangement, and is configured to store electric charge generated by the actuation arrangement,
    wherein the functional actuation modes comprise a first functional actuation mode wherein the multifunctional haptic actuator is configured to generate mechanical vibrations by supplying electric charge from the energy storage to the actuation arrangement, the electric charge being configured to generate movement of the energy storage, and
    wherein the functional actuation modes further comprise a second functional actuation mode wherein the multifunctional haptic actuator is configured to generate electric charge by mechanical vibrations of the energy storage, the mechanical vibrations being configured to generate electric charge in the actuation arrangement, the electric charge being configured to be stored in the energy storage.

2. The multifunctional haptic actuator according to claim 1, wherein the mechanical vibrations are configured to be generated at frequencies below 30 Hz.

3. The multifunctional haptic actuator according to claim 1,
wherein the actuation arrangement is configured to generate electromagnetic or piezoelectric forces,
wherein, in the first functional actuation mode, the multifunctional haptic actuator is configured to supply the electric charge from the energy storage to the actuation arrangement generating the electromagnetic or piezoelectric forces, the electromagnetic or piezoelectric forces being configured to generate movement of the energy storage, and
wherein, in the second functional actuation mode, the multifunctional haptic actuator is configured such that the mechanical vibrations of the energy storage generate the electromagnetic or piezoelectric forces, the electromagnetic or piezoelectric forces being configured to generate the electric charge to be stored in the energy storage.

4. The multifunctional haptic actuator according to claim 1, wherein the functional actuation modes further comprise a third functional actuation mode, wherein in the third functional actuation mode, the multifunctional haptic actuator is configured to generate electric charge in the actuation arrangement by a magnetic energy transmitter, the electric charge being configured to be stored in the energy storage.

5. The multifunctional haptic actuator according to claim 1, wherein the plurality of actuation axes comprises at least one linear axis or at least one rotation axis.

6. The multifunctional haptic actuator according to claim 1, wherein movement of the energy storage is configured to be executed along or around the plurality of actuation axes simultaneously.

7. The multifunctional haptic actuator according to claim 1, wherein movement of the energy storage is configured to be executed along a first actuation axis, a second actuation axis, and a third actuation axis, simultaneously or sequentially, and
wherein the first actuation axis, the second actuation axis, and the third actuation axis form a three-dimensional Cartesian coordinate system.

8. The multifunctional haptic actuator according to claim 1, wherein the actuation arrangement comprises a voice coil actuator,
wherein the voice coil actuator comprises a first magnet-and-coil arrangement configured to generate movement along the first actuation axis, and
wherein the voice coil actuator further comprises a second magnet-and-coil arrangement configured to generate movement along the second actuation axis and the third actuation axis.

9. The multifunctional haptic actuator according to claim 8, wherein:
the first magnet-and-coil arrangement comprises a first magnet and a first coil arranged adjacent the first magnet, and
the second magnet-and-coil arrangement comprises a second magnet and a second coil arranged adjacent the second magnet.

10. The multifunctional haptic actuator according to claim 9, wherein;
the first coil is arranged such that it extends around a periphery the first magnet, and
the second magnet-and-coil arrangement further comprises a third magnet and a third coil arranged adjacent the third magnet, a fourth magnet and a fourth coil arranged adjacent the fourth magnet, and a fifth magnet and a fifth coil arranged adjacent the fifth magnet,
the second magnet-and-coil arrangement being arranged such that it extends around a periphery of the first magnet-and-coil arrangement.

11. The multifunctional haptic actuator according to claim 8, wherein the rotation axis is identical to the first actuation axis, and
rotation around the rotation axis is generated by the first magnet-and-coil arrangement.

12. The multifunctional haptic actuator according to claim 1, wherein the actuation arrangement comprises a multi-layered piezoelectric actuator, or any one of electromechanical polymer-metal composite or alloy material, magnetorestricitive material, electroactive material, photoactive material, temperature active material, or magnetoactive material.

13. The multifunctional haptic actuator according to claim 1, further comprising at least one elastic element limiting the movement of the energy storage along or around the plurality of actuation axes.

14. A multifunctional haptic actuation system for an electronic device comprising the multifunctional haptic actuator according to claim 1, a processor, control circuitry, and a flexible battery cable extending from the energy storage to an exterior of the haptic actuator.

15. The multifunctional haptic actuation system according to claim 14, wherein the multifunctional haptic actuation system further comprises at least one position sensor adapted for tracking the position of the multifunctional haptic actuator.

* * * * *

UNITED STATES PATENT AND TRADEMARK OFFICE
CERTIFICATE OF CORRECTION

PATENT NO. : 12,124,631 B2  
APPLICATION NO. : 17/841376  
DATED : October 22, 2024  
INVENTOR(S) : Evreinov et al.

Page 1 of 1

It is certified that error appears in the above-identified patent and that said Letters Patent is hereby corrected as shown below:

In the Claims

Claim 10: Column 8, Line 10: "9, wherein;" should read as -- 9, wherein: --.

Signed and Sealed this  
Twenty-seventh Day of May, 2025

Coke Morgan Stewart  
*Acting Director of the United States Patent and Trademark Office*